United States Patent
Lee et al.

(10) Patent No.: US 9,047,003 B2
(45) Date of Patent: Jun. 2, 2015

(54) TOUCH INPUT DEVICE AND METHOD FOR PORTABLE DEVICE

(75) Inventors: Bong Won Lee, Seoul (KR); Nho Kyung Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 12/554,522

(22) Filed: Sep. 4, 2009

(65) Prior Publication Data

US 2010/0085318 A1 Apr. 8, 2010

(30) Foreign Application Priority Data

Oct. 2, 2008 (KR) ........................ 10-2008-0097300

(51) Int. Cl.
G06F 3/041 (2006.01)
G06F 3/0488 (2013.01)

(52) U.S. Cl.
CPC .................................. G06F 3/04883 (2013.01)

(58) Field of Classification Search
USPC ............................ 345/173–176; 125/173–176
See application file for complete search history.

(56) References Cited

U.S. PATENT DOCUMENTS

| | | | | |
|---|---|---|---|---|
| 5,471,578 A | * | 11/1995 | Moran et al. | 715/863 |
| 5,664,133 A | * | 9/1997 | Malamud et al. | 715/816 |
| 6,208,324 B1 | * | 3/2001 | Sundstrom et al. | 715/846 |
| 6,433,800 B1 | * | 8/2002 | Holtz | 715/835 |
| 6,545,669 B1 | | 4/2003 | Kinawi et al. | |
| 2004/0119763 A1 | * | 6/2004 | Mizobuchi et al. | 345/863 |
| 2005/0052427 A1 | * | 3/2005 | Wu et al. | 345/173 |
| 2006/0238517 A1 | | 10/2006 | King et al. | |
| 2007/0036346 A1 | * | 2/2007 | Kwon | 379/413 |
| 2007/0064004 A1 | * | 3/2007 | Bonner et al. | 345/442 |
| 2007/0239745 A1 | * | 10/2007 | Guerraz et al. | 707/101 |
| 2008/0074399 A1 | * | 3/2008 | Lee | 345/173 |
| 2009/0222766 A1 | * | 9/2009 | Chae et al. | 715/835 |

FOREIGN PATENT DOCUMENTS

| | | |
|---|---|---|
| EP | 0816998 | 1/1998 |
| EP | 1363184 | 11/2003 |

OTHER PUBLICATIONS

The First Office Action dated Aug. 17, 2012 issued for related Chinese Patent Application No. 200910179000.1.
European Search Report dated Aug. 6, 2012 issued for related European Patent Application No. 09169420.8.

* cited by examiner

*Primary Examiner* — Nicholas Lee
(74) *Attorney, Agent, or Firm* — H.C. Park & Associates, PLC

(57) ABSTRACT

A touch input device and method for a portable device that is capable of inputting various user commands with diversified touch events detected on a touch screen is provided. A touch input method for a mobile terminal having a touch screen may include displaying a plurality of representative images representing content objects on the touch screen, selecting at least one representative image in response to a first command designated for a first touch event on the touch screen, and executing a second command designated for a second touch event on the touch screen. The second touch event may be defined by a movement direction, speed, a lift position of a touch, and the representative images selected by the first command.

20 Claims, 9 Drawing Sheets

TOUCH INPUT DEVICE AND METHOD FOR PORTABLE DEVICE

CROSS REFERENCE TO RELATED APPLICATION

This application claims priority from and the benefit of Korean Patent Application No. 10-2008-0097300, filed on Oct. 2, 2008, which is hereby incorporated by reference for all purposes as if fully set forth herein.

BACKGROUND OF THE INVENTION

1. Field of the Invention

Exemplary embodiments of the present invention relate to a portable device. In particular, exemplary embodiments of the present invention relate to a touch input device and method for a portable device that is capable of inputting various user commands with diversified touch events on a touch screen.

2. Description of the Background

Recently, portable devices have become very popular and are widely used for various purposes due to, for example, their compact designs for portability and useful applications. Particularly, the mobile phone (hereinafter, the term "mobile terminal" is interchangeably used with "mobile phone") is becoming one of the most versatile devices with diverse supplementary services, in addition to basic voice communication functionality.

Initially, a mobile terminal was manufactured with large batteries and internal components to secure system stability. However, due to large component size, the mobile terminals were also quite large, thereby limiting their mobility. With advancements in device integration and battery technologies, however, mobile terminals can now be manufactured in slim and compact designs.

Despite having slim and compact designs, a mobile terminal's display device must have a size capable of supporting diverse applications and services. Particularly when using an Internet access service, a mobile terminal having a small display screen may provide limited user satisfaction. More recently, touch screens are being used in place of conventional keypads in order to secure a display space as large as possible in the mobile terminal.

However, the current touch screen-equipped mobile terminal having no keypad or a down-sized keypad may be limited to generating input signals only through a touch on the touch screen.

SUMMARY OF THE INVENTION

Exemplary embodiments of the present invention provide a touch input device and method for a mobile terminal having a touch screen capable of receiving various user commands with diversified touch events.

Additional features of the invention will be set forth in the description which follows, and in part will be apparent from the description, or may be learned by practice of the invention.

Exemplary embodiments of the present invention disclose a touch input method for a mobile terminal having a touch screen. The method includes displaying, on the touch screen, a plurality of representative images corresponding to content objects. The method further includes selecting, from the plurality of representative images, at least one representative image in response to a first command corresponding to a first touch event detected on the touch screen. The method further includes executing a second command corresponding to a second touch event detected on the touch screen. The second touch event is defined by a movement direction, speed, and a lift position of a touch associated with the first touch event and the second touch event, and the at least one representative image selected by the first command.

Exemplary embodiments of the present invention also disclose a touch input method for a mobile terminal having a touch screen. The method includes collecting data of contact points on a line that a first touch event draws on the touch screen without lift; determining, based on the data of the contact points, whether a closed loop is detected; and selecting, when a closed loop is detected, at least one of a set of the representative images located inside of the closed loop, a set of the representative images located across the line of the closed loop, and a group of the representative images each of which a portion placed inside of the closed loop is greater than a predetermined percentage.

Exemplary embodiments of the present invention disclose a touch input device for a mobile terminal. The device includes a display unit and a control unit. The display unit displays a plurality of representative images. Each representative image corresponds to a contents object. The display unit comprises a touch screen to detect touch events including a touch-down event to select a representative image and a drag event to move the selected representative image. The control unit executes a user command corresponding to a touch event detected on the touch screen. The execution is based on a movement direction, speed, and a final contact point, and a content object type corresponding to the selected representative image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF ILLUSTRATED EMBODIMENTS

Figure 1:
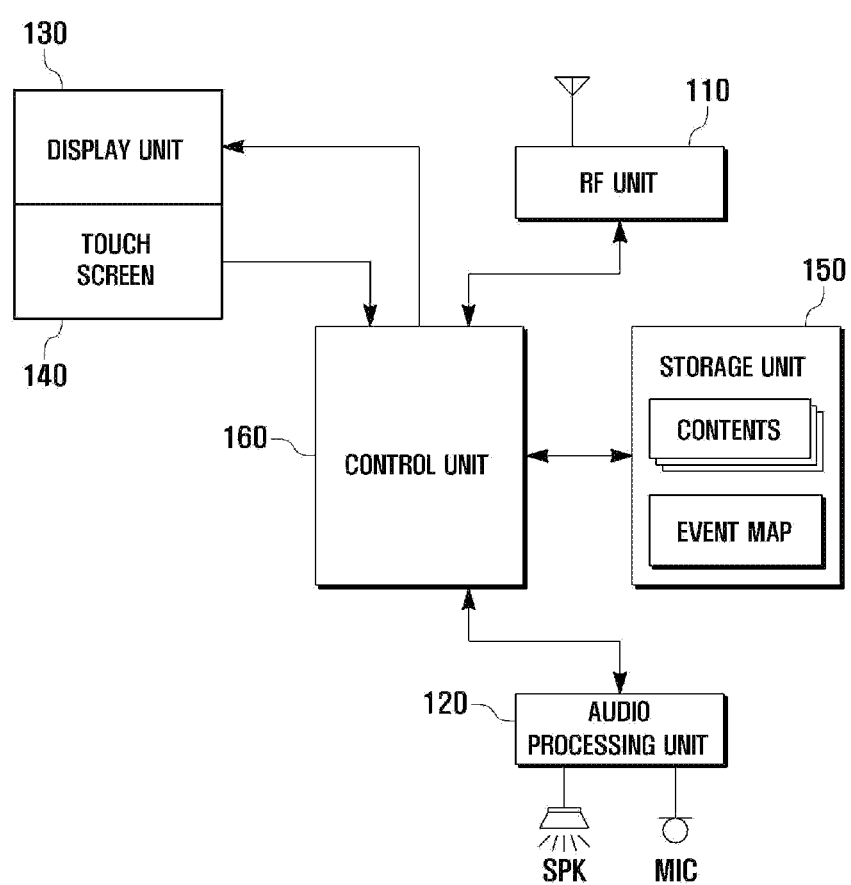
FIG. 1 is a block diagram illustrating a configuration of a touch screen-enabled mobile terminal according to exemplary embodiments of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity.

Hereinafter, exemplary embodiments of the present invention are described in detail with reference to the accompanying drawings.

FIG. 1 is a block diagram illustrating a configuration of a touch screen-enabled mobile terminal according to exemplary embodiments of the present invention.

Referring to FIG. 1, the mobile terminal 100 may include a Radio Frequency (RF) unit 110, an audio processing unit 120, a display unit 130, a touch screen 140, a storage unit 150, and a control unit 160. The RF unit 110 can be omitted if the mobile terminal 100 is a portable device with no radio communication function.

The mobile terminal 100 may allow the user to select an object stored in the storage unit 150 by using the touch screen 140 provided on the display unit 130. The mobile terminal 100 may then convert a touch event prompted by the user into a corresponding input signal with reference to an event map stored in the storage unit 150. A touch event may be detected on the touch screen 140 of the mobile terminal 100. The touch event may be defined using three attributes, namely, speed, direction, and location. When these three attributes of a touch event satisfy predetermined values designated for a function, the mobile terminal 100 may execute the function mapped to the touch event. The mobile terminal 100 may allow the user to select multiple objects displayed on the display unit 130. Furthermore, the mobile terminal 100 may play the contents represented by the objects, or may convert the objects into new types of objects. The internal function blocks of the mobile terminal 100 are described hereinafter in more detail.

The RF unit 110 may transmit and receive radio signals carrying data for voice communication service, Short Message Service (SMS), Multimedia Message Service (MMS), and the like. The RF unit 110 may superimpose the audio/video and control data to be transmitted on a radio frequency signal, and may extract the audio/video and control data from a received radio frequency signal. The RF unit 110 may include an RF transmitter for up-converting and amplifying the signal frequency to be transmitted, and an RF receiver for low noise amplifying and down-converting the received radio signal. The RF unit 110 can transmit a specific content playing or stored in the mobile terminal 100 in the form of a radio signal under control of the control unit 160, according to a specific touch event detected on the touch screen 140.

The audio processing unit 120 may include a speaker (SPK) for outputting audio signals in the form of an audible sound wave, and a microphone (MIC) for receiving sound wave (e.g. user voice), in the form of an audio signal. For example, when a plurality of content objects including at least one audio content object having a sound source are generated or received, the audio processing unit 120 may output the sound source through the speaker (SPK) in the form of an audible sound wave under the control of the control unit 160.

The display unit 130 may display various video data corresponding to the video contents stored in the storage unit 150, user input data, and various supplementary function screens. The display unit 130 can be implemented with a Liquid Crystal Display (LCD). In some cases, the LCD may be configured with a touch screen. Accordingly, the display unit 130 can work as an input device. The display unit 130 can display a media board screen for presenting multiple contents objects stored in the storage unit 150. The media board screen can display icons representing various kinds of content objects stored in the storage unit 150. In some cases, the displayed content objects may be presented in an order. In other cases, the displayed content objects may be presented out of order. The touch screen 140 of the mobile terminal 100 may be configured with touch points according to an event map stored in storage unit 150. The event map may be used to select the icon representing a content object displayed on the touch screen 140. A user interface provided by the display unit 130 is described hereinafter in detail with reference to drawings.

The touch screen 140 may be provided by the display unit 130 to detect a touch event on the display unit 130, and may output a corresponding signal to the control unit 160. The touch screen 140 can detect various touch events including a touch-down event when a finger or an object contacts the touch screen 140; a drag event occurred by dragging the contact point of the finger or object on the touch screen 140 in a predetermined direction at a speed faster than a predetermined value; and a touch-lift event that occurs by lifting the finger or object contacting the touch screen 140. A closed loop drawing event may be defined hereinafter. When a touch (or contact) is detected at a point on the touch screen 140 and the touch moves (e.g., drag) on the touch screen 140, the touch screen 140 may calculate the coordinates of the contact points and may indicate that the touch is passing in real time. The touch screen 140 may then check whether a specific coordinate is detected twice without occurrence of a touch-lift event.

If a specific coordinate is detected twice, a closed loop drawing event is determined to have occurred. In this case, the touch screen 140 may transmit, to the control unit 160, information on the area defined by the closed loop drawing event. The control unit 160 may select the content objects represented by the representative images (e.g. icons and/or thumbnail images) located inside and/or on the boundary line of the closed loop, and may execute a command designated for the selected content objects according to a preset user configuration.

The storage unit 150 may store an operating system of the mobile terminal 100 and application programs for executing supplementary functions of the mobile terminal 100, such as, for example, file playback function, camera function, and broadcast playback function (when supported by the mobile terminal). The storage unit 150 may also store user data and application data generated or downloaded through a network while the application programs are running. The storage unit 150 may further store at least one program and data memories. The storage unit 150 may store the event map for operating the touch screen 140, and a touch screen application program for defining the coordinates on the display screen and for generating a signal corresponding to a touch event that occurred on the display screen.

The program memory can be configured to store the operating system and the touch screen application program. The program memory may also store other application programs, such as, for example, a text messaging program for composing and transmitting a text message, a content transmission program, a short range communication management program (e.g. a Bluetooth application program), and a file management program that may be executed interactively with the operation of the touch screen application program. These application programs can be executed simultaneously or independently in accordance with the touch event detected on the touch screen 140. For instance, when a touch event is detected while the touch screen application is running, at least one icon selected by the touch event may be highlighted to indicate that the content object represented by the icon is selected. If a specific touch event is detected while the at least one icon is highlighted, the touch screen application program may execute an application program (or function) mapped to the highlighted icon and corresponding touch event by looking up the event map. The application program can be, for example, a text messaging application program for composing and transmitting a text message and/or a file management application for deleting, copying, and pasting the selected content object.

The data memory may store application data generated while the application programs are running and/or user data input by the user. The application and user data can include, but not be limited to, phonebook data, video data captured with camera function, and text message data transmitted and received by means of the RF unit 110. The data memory may store various content objects and an event map. The content objects can be reproduced as a set of aggregated content objects by simultaneously selecting multiple content objects according to a preset configuration of the mobile terminal 100.

The control unit 160 may control the entire operation of the mobile terminal 100 and signaling among the internal function blocks. The control unit 160 may configure the coordinates on the touch screen 140 based on the event map stored in the storage unit 150, and, when detecting a touch event, may generate an input signal with reference to the event map.

Figure 2:
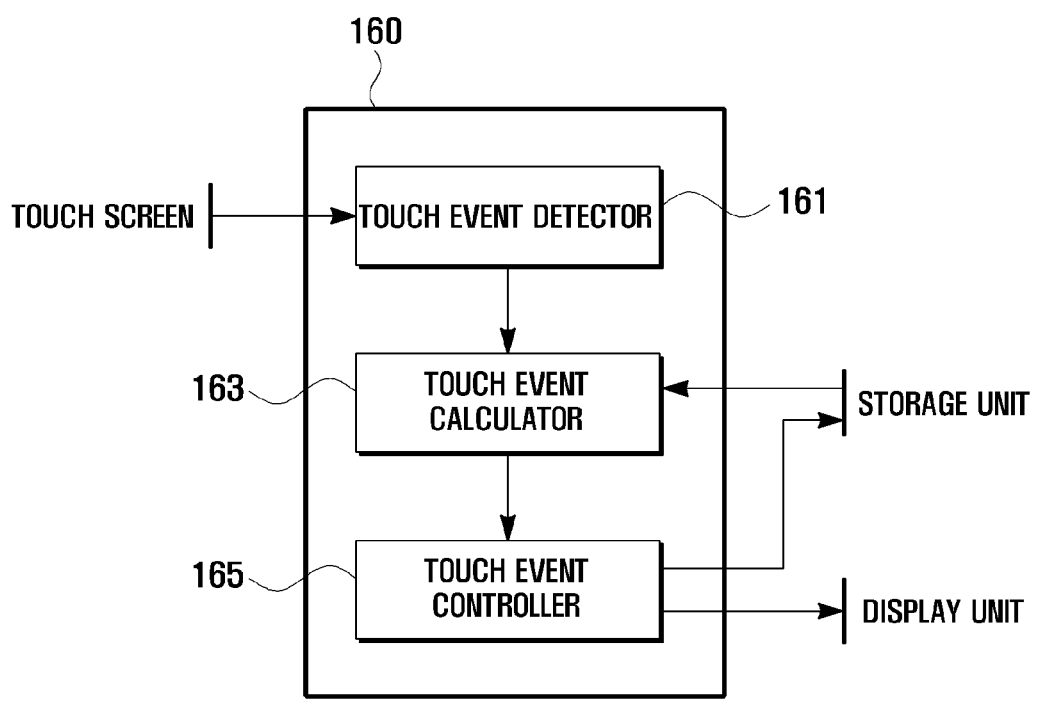
FIG. 2 is a block diagram illustrating a configuration of the control unit in FIG. 1 according to exemplary embodiments of the present invention.

The control unit 160 may include a touch event detector 161, a touch event calculator 163, and a touch event controller 165, as shown in FIG. 2.

FIG. 2 is a block diagram illustrating a configuration of the control unit in FIG. 1 according to exemplary embodiments of the present invention.

The touch event detector 161 may detect a touch event that has occurred on the touch screen 140. If a touch event has been detected, the touch event detector 161 may acquire the coordinates on the touch screen 140 corresponding to the touch event. The touch event detector 161 may check the duration of the touch event (i.e., the duration of stationary holding of the contact with the touch screen 140). If the contact point moves, the touch event detector 161 may detect the direction and speed of the movement. That is, the touch event detector may collect touch event information including the initial contact point where the touch-down occurs, and the movement direction and speed of the touch event. The touch event information also includes the final contact point at which the touch-lift occurs.

The touch event calculator 163 may determine which user command is input by analyzing the touch event information output by the touch event detector 161. The touch event calculator 163 may load the touch event map from the storage unit 150, and may retrieve the input signal mapped to the touch event. For instance, when a touch-down event is detected at the location where a specific icon is located on the touch screen 140, the touch event detector 161 may output touch event information indicating the selection of the icon to the touch event calculator 163. Upon receipt of the touch event information, the touch event calculator 163 may output an input signal indicating the selection of the icon to the touch event controller 165. If the contact point is moving without a lift, the touch event detector 161 may detect the movement of the contact point and may output information on the movement direction and speed to the touch event calculator 163. The touch event calculator 163 may analyze the touch event information, output the input signal corresponding to the touch event, and may transmit the input signal to the touch event controller 165. The input signal may be associated with deleting the selected content object, changing the name of the content object, transmitting a text message, or Bluetooth transmission.

The touch event controller 165 may highlight the icons selected on the touch screen 140, and process the content objects represented by the selected icons according to the input signal.

For instance, when a touch-down event is detected at a position where a specific icon is located on the touch screen 140, the touch event controller 165 may highlight the icon. Sequentially, if the contact point moves in a specific direction (i.e., a drag event is detected), the touch event controller 165 may move the icon according to the movement direction of the contact point. If the movement direction and speed of the contact point reaches a predetermined threshold value, or the contact point is located at a specific position, the touch event controller 165 may perform a function preset corresponding to the movement speed and direction or the location of the contact point. For instance, when the contact point placed on an icon moves upward across a boundary of the display zone of the touch screen 140 at a speed faster than a predetermined threshold value, the touch event controller 165 may interpret this touch event as a file name edit command, and may display a popup window to allow the user to rename the content object. A single content object handling operation of the mobile terminal 100 may be described hereinafter in detail with reference to the accompanying drawings.

FIG. 3A, FIG. 3B, FIG. 3C, and FIG. 3D show exemplary screen images illustrating steps of a touch input method for a mobile terminal according to exemplary embodiments of the present invention.

Figure 3A:
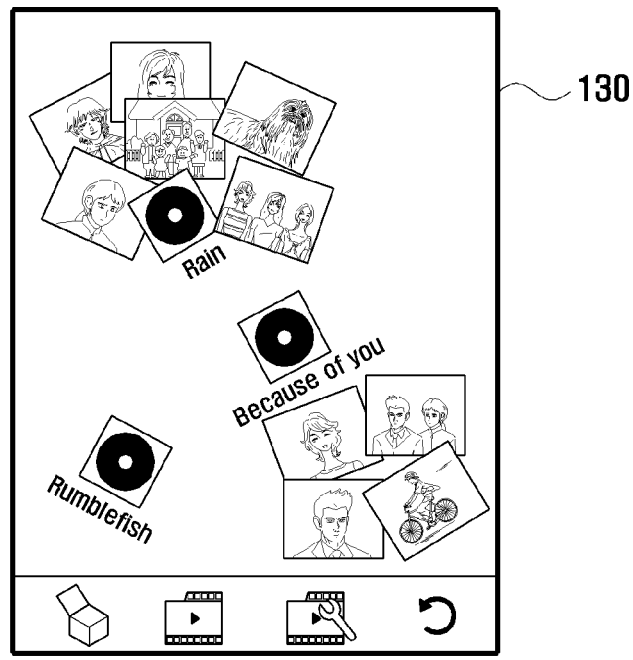
FIG. 3A is a diagram illustrating a step of displaying a media board application screen for a touch input method in a mobile terminal according to exemplary embodiments of the present invention.

FIG. 3A is a diagram illustrating a step of displaying a media board application screen for a touch input method in a mobile terminal according to exemplary embodiments of the present invention.

Referring to FIG. 3A, if a media board application execution command is input by the user selecting a "media board" menu item on a menu screen, the mobile terminal 100 may instruct the display unit 130 to display an application screen of the media board application. The media board application screen may include a plurality of representative images representing the content objects stored in the storage unit 150, as shown in FIG. 3A. The content objects can include, but are not limited to, text content objects, video content objects, and audio content objects. The content object can be displayed on the media board application window in the form of a representative image, such as an icon or a thumbnail image. For example, a video content object, such as a still picture, can be represented by a thumbnail image, and an audio content object can be represented by a predetermined icon. The representative images can be arranged in a particular order or, as shown in FIG. 3A, out of order (e.g., randomly) on the media board application screen. In some cases, the arrangement of the representative images can be maintained when the media board application is terminated and then executed again later.

Figure 3B:
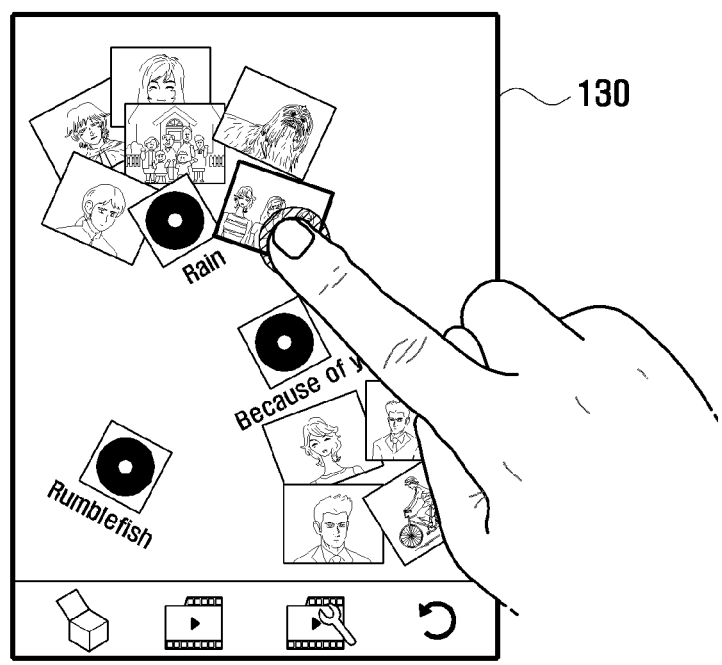
FIG. 3B is a diagram illustrating a step of processing a touch-down event for a touch input method in a mobile terminal according to exemplary embodiments of the present invention.

FIG. 3B is a diagram illustrating a step of processing a touch-down event for a touch input method in a mobile terminal according to exemplary embodiments of the present invention.

Referring to FIG. 3B, if a representative image is selected in the media board application screen by a touch-down event on the touch screen 140, the control unit 160 may instruct the display unit 130 to highlight the selected representative image placed at the contact point. The touch event detector 161 of the control unit 160 may detect the touch-down event on the touch screen 140, and may identify the representative image located at the contact point on which the touch-down event is detected. Since multiple representative images can be distributed out of order and may overlap each other on the media board screen, the control unit 160 may search for the representative image placed at the top of the representative images at the location where the touch-down event is detected. For example, when multiple representative images are partially overlapped at the location where the touch-down event has been detected, the control unit 160 may select the image placed on top of the representative images and may highlight the selected representative image. The control unit 160 may give selection priority to non-overlapped parts of the overlapped representative images. If the selected representative image is partially hidden by another representative image, the control unit 160 may retrieve the content object represented by the selected representative image from the storage unit 150, and may display the complete image of the selected representative image. If a user-desired representative image is located below another representative image at the location where the touch-down event is detected, the representative image at the top of the overlapped representative images may be selected and dragged in any direction using a drag event. Subsequently, a user may select, as described above, the representative image of the user's choice, which may now lie on top of representative images at the location where the touch-down event was detected.

Figure 3C:
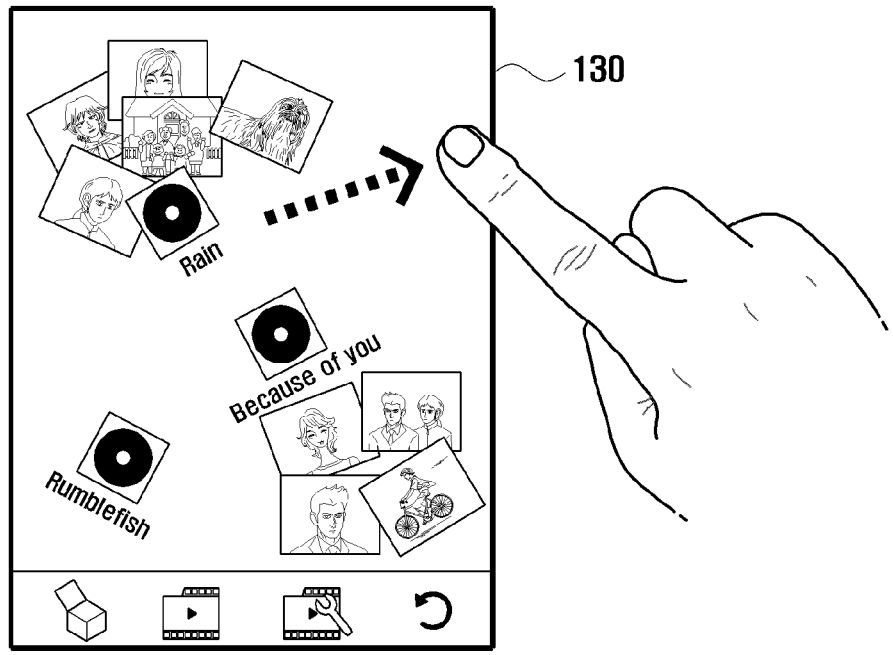
FIG. 3C is a diagram illustrating a step of processing a drag event for a touch input method in a mobile terminal according to exemplary embodiments of the present invention.
Figure 3D:
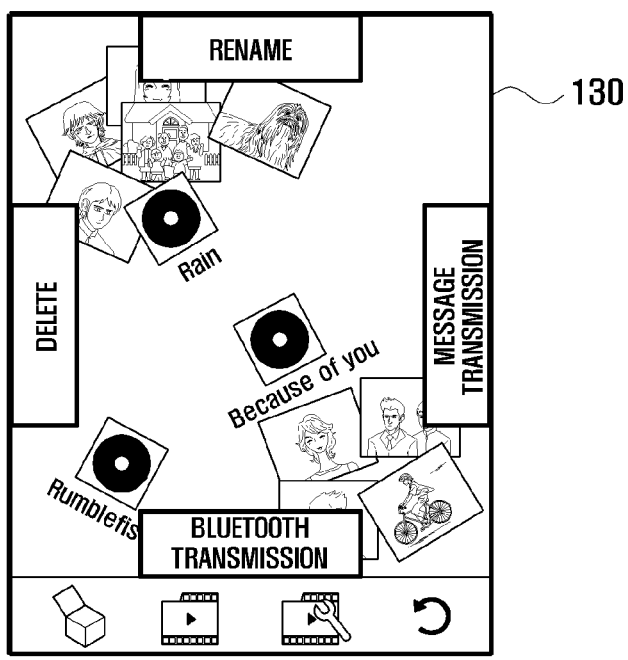
FIG. 3D is a diagram illustrating a step of displaying command tips designated for direction-specific drag events for a touch input method in a mobile terminal according to exemplary embodiments of the present invention.

FIG. 3C is a diagram illustrating a step of processing a drag event for a touch input method in a mobile terminal according to exemplary embodiments of the present invention.

Referring to FIG. 3C, if a drag event (i.e., movement of the contact point in a specific direction) is detected while the representative image is selected by the touch-down event, the control unit 160 may instruct the display unit 130 to show the drag movement of the selected representative image according to the movement of the contact point. The control unit 160 may then calculate the movement direction, speed, and final location of the drag event, and may load the event map.

The control unit 160 can designate specific commands for the drag events across boundaries of the display zone of the touch screen 140. For example, referring to FIG. 3C and FIG. 3D, the control unit 160 may designate a file name change command (e.g., Rename) for a drag event across the top boundary of the display zone of the touch screen 140; a Bluetooth transmission command for a drag event across the bottom boundary of the display zone of the touch screen 140; a delete command for a drag event across the left boundary of the display zone of the touch screen 140; and a message transmission command for a drag event across the right boundary of the display zone of the touch screen 140. The command designation can be changed according to the mobile terminal designer's preference/selection or the user's preference/selection. When the drag event occurs in a direction towards one of the four boundaries of the display zone of the touch screen 140 at a speed faster than a predetermined threshold speed, while a representative image is selected by a touch-down event, the control unit 160 may execute the command designated for the drag event. For instance, when a representative image is selected by a touch-down event and then dragged by a drag event in an upward direction of the touch screen 140 across the boundary of the display zone at a speed faster than the predetermined threshold value, the control unit 160 may determine an input of a file name change command and may display a popup window for the user to rename the content object represented by the representative image. If the mobile terminal 100 is not provided with a keypad, the control unit 160 may instruct the display unit 130 to display a popup window such that the user may use a key map to enter alphanumeric data in a text box of the popup window.

When a representative image is selected by a touch-down event and dragged by a drag event in a rightward direction of the touch screen 140 across the boundary of the display zone, at a speed faster than the predetermined threshold value, the control unit 160 may determine an input of the message transmission command, and may activate a message composition application. When the selected representative image represents a text message object, the control unit 160 may execute a text message composition application, and may instruct the display unit 130 to display a text message in the text message object. When the selected representative image represents an audio content object or a video content object, the control unit 160 may execute a multimedia message composition application, and instruct the display unit 130 to display the audio or video content object.

When a representative image is selected by a touch-down event and then dragged by a drag event towards a left direction of the touch screen 140 across the boundary of the display zone, at a speed faster than the predetermined threshold value, the control unit 160 may determine an input of the delete command, and may delete the content object represented by the representative image from the storage unit 150. To prevent the content objects from being accidentally deleted, the control unit 160 can instruct the display unit 130 to display, using a touch screen 140, a popup window to obtain confirmation of the delete command. When the drag event occurs across one of the boundaries of the display zone of the touch screen 140, command tips indicating the commands to be executed according to the drag events across the boundaries are displayed on the respective boundaries.

Although the commands are designated for the touch-down and drag events in the above description, exemplary embodiments of the present invention are not limited thereto. For example, various other commands can be designated for drag events occurring on the touch screen in specific directions at a speed faster than a predetermined threshold value. Furthermore, the commands designated for available drag events can be executed by touching the corresponding command tips (e.g., icons displaying "Rename," "Message Transmission," "Bluetooth Transmission," and "Delete" on the top, right, bottom, and left sides of the touch screen 140).

A multiple content objects handling operation of the mobile terminal is described hereinafter in detail with reference to accompanying drawings.

FIG. 4A, FIG. 4B, FIG. 4C, FIG. 4D, and FIG. 4E show exemplary screen images illustrating steps of a touch input method for a mobile terminal according to exemplary embodiments of the present invention.

Figure 4A:
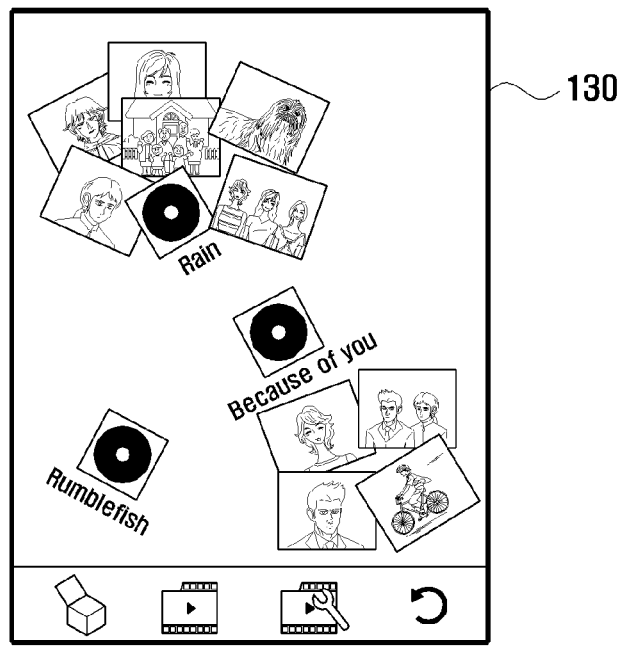
FIG. 4A is a diagram illustrating a step of displaying a media board application screen for a touch input method in a mobile terminal according to exemplary embodiments of the present invention.

FIG. 4A is a diagram illustrating a step of displaying a media board application screen for a touch input method in a mobile terminal according to exemplary embodiments of the present invention.

Referring to FIG. 4A, if a media board application execution command is input by the user selecting a "media board" menu item on a menu screen, the mobile terminal 100 may instruct the display unit 130 to display an application screen of the media board application. The media board application screen may include a plurality of representative images representing the content objects stored in the storage unit 150. The content objects may include, but not be limited to, text content objects, video content objects, and audio content objects. The representative images may be displayed on the media board application screen in some cases, in order, and in some cases, out of order (e.g., randomly). The representative images may be selected, moved, and rearranged in the display zone of the touch screen 140 according to the user's preference/selection.

Figure 4B:
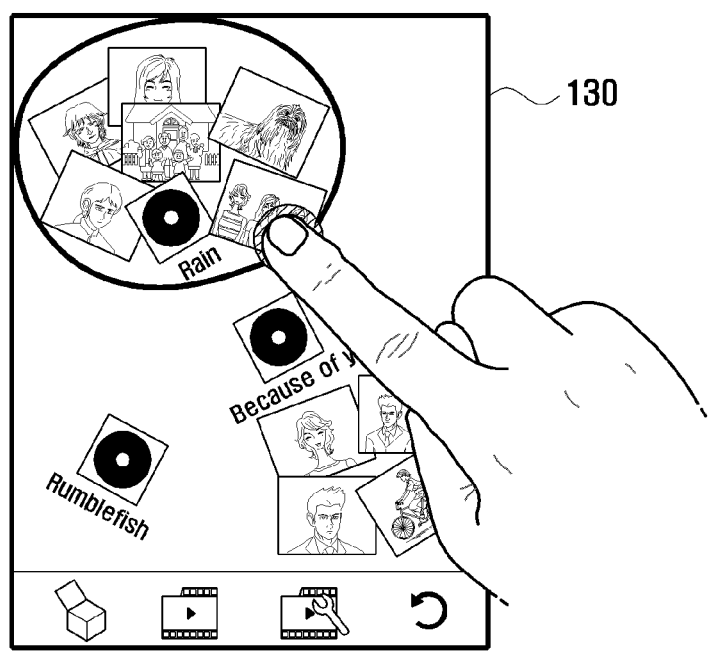
FIG. 4B is a diagram illustrating a step of processing a closed loop drag event for a touch input method in a mobile terminal according exemplary embodiments of the present invention.

FIG. 4B is a diagram illustrating a step of processing a closed loop drag event for a touch input method in a mobile terminal according exemplary embodiments of the present invention.

Referring to FIG. 4B, when a touch event is detected in the media board application screen and the touch is dragged to draw a closed loop on the touch screen 140, the control unit 160 may determine that a closed loop drawing event has occurred for selecting one or more content objects. When a touch event is detected on the touch screen 140, the control unit 160 may determine whether there is a representative image at the location where the touch event is detected. If there is a representative image at the location where the touch event is detected, the control unit 160 may determine the occurrence of a touch-down event for selecting a content object represented by the representative image, and may highlight the representative image. Otherwise, if there is not a representative image at the point on which the touch is detected, the control unit 160 may monitor movement of the touch (e.g., contact). If the touch moves, the control unit 160 may determine coordinates of the contact points contacted by the touch in real time, and may check whether a specific coordinate is detected twice without lift. If a specific coordinate is detected twice without lift, the control unit 160 determines occurrence of a closed loop drawing event, and may execute a command designated for the closed loop drawing event. Once a closed loop drawing event is detected, the control unit 160 may record coordinates on which the touch has passed, and may display the closed loop trace on the touch screen 140, as shown in FIG. 4B, such that the user may verify the area defined by the closed loop trace.

Figure 4C:
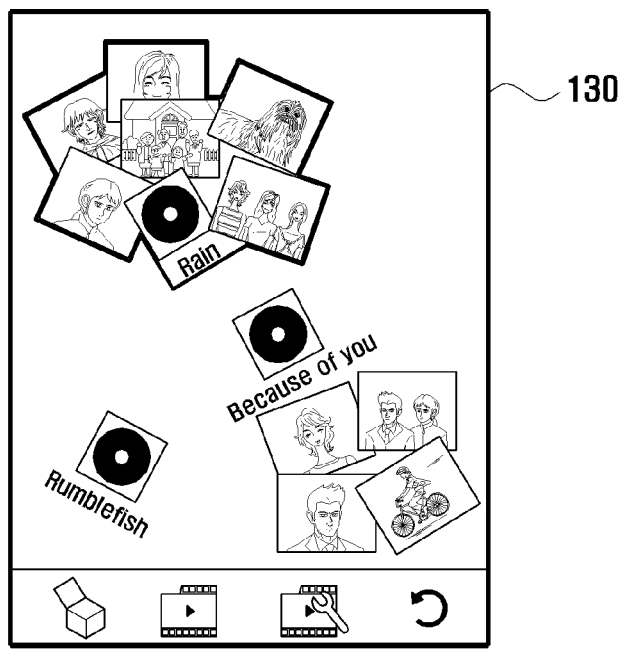
FIG. 4C is a diagram illustrating a step of highlighting selected representative images for a touch input method in a mobile terminal according to exemplary embodiments of the present invention.

FIG. 4C is a diagram illustrating a step of highlighting selected representative images for a touch input method in a mobile terminal according to exemplary embodiments of the present invention.

Referring to FIG. 4C, once multiple representative images are selected by a closed loop drawing event occurring on the touch screen 140, the control unit 160 may highlight the selected representative images and may execute a command designated for the closed loop drawing event. The control unit 160 may analyze the locations of the representative images displayed in the multimedia board application screen, and may retrieve the representative images placed inside of the area defined by the closed loop. For example, the control unit 160 can determine the selected representative images depending on whether coordinates occupied by the representative images overlap with the coordinates of the area defined by the closed loop. The control unit 160 can select the representative images placed across the boundary line of the closed loop as well as representative images placed inside of the closed loop. In some cases, the control unit 160 may only select the representative images placed inside the closed loop. In some cases, the control unit 160 may also select the representative images placed across the boundary line of the closed loop if the part placed inside the closed loop is greater than a predetermined percentage of the representative image area. The criteria for selecting the representative images can be configured according to a user's preference/selection, or a designer's preference/selection, and the mobile terminal 100 can be configured to provide a menu option for configuring the representative image selection criteria.

Figure 4D:
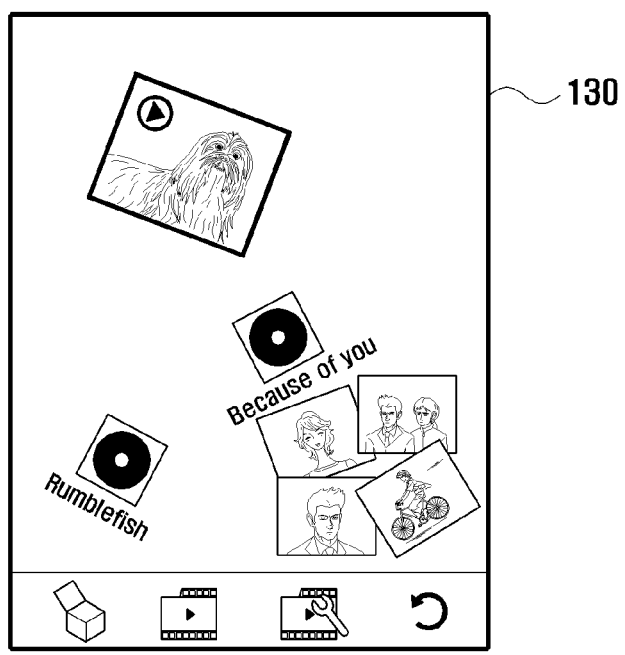
FIG. 4D is a diagram illustrating a step of executing a command designated for a closed loop drawing event for a touch input method in a mobile terminal according to exemplary embodiments of the present invention.

FIG. 4D is a diagram illustrating a step of executing a command designated for a closed loop drawing event for a touch input method in a mobile terminal according to exemplary embodiments of the present invention.

Referring to FIG. 4D, after highlighting the representative images selected by the closed loop drawing event, the control unit 160 may combine and reproduce the content objects represented by the representative images by replacing the combined content objects with new content objects and new representative images corresponding to the combined content objects. For example, when multiple content objects stored in the storage unit 150 are selected by the closed loop drawing event on the touch screen 140, the selected content objects may be reproduced as a combined content object automatically. Accordingly, a representative image representing the combined content object may be displayed in the multimedia board application window. For instance, when the selected content objects include multiple still pictures and an audio file, the control unit 160 may combine the still pictures and the audio file into a "slide picture album" as a multimedia content object which displays the still pictures in slide-show format while playing the audio file as background music. The slide picture album can be configured to display the pictures in series at a predetermined display interval, along with the background music.

When the selected content objects include multiple motion and still pictures and multiple music files, the control unit 160 may arrange the multiple motion pictures followed by the multiple still pictures in series such that the motion and still pictures are played in sequential order while playing the audio files as background music in sequential order. In some cases, the multiple still pictures may be followed by multiple motion pictures in series, with the audio files being played in sequential order as background music.

This file management and control function can be executed by a command designated for the closed loop drawing event in combination with a drag event as described above.

Figure 4E:
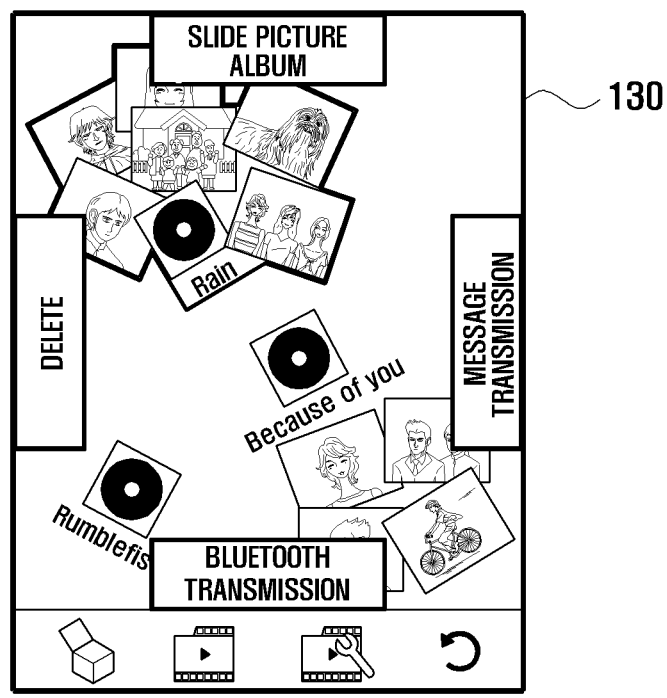
FIG. 4E is a diagram illustrating a step of displaying command tips designated for available direction-specific drag events following a closed loop drawing event for a touch input method in a mobile terminal according to exemplary embodiments of the present invention.

FIG. 4E is a diagram illustrating a step of displaying command tips designated for available direction-specific drag events following a closed loop drawing event for a touch input method in a mobile terminal according to exemplary embodiments of the present invention.

When the multiple representative images are selected by the closed loop drawing event as explained above, the control unit 160 may highlight the selected representative images as shown in FIG. 4C, and may display command tips on the boundaries of the touch screen 140 to inform the user of commands designated for available drag events following the closed loop drawing event. As shown in FIG. 4E, command tips associated with a slide picture album command, a delete command, a message transmission command, and a Bluetooth transmission command designated for an upward drag event, a leftward drag event, a rightward drag event, and a bottomward drag event, respectively, are displayed on the respective top, left, right, and bottom boundaries of the touch screen 140. The commands designated for the four direction drag events can be changed according to the mobile terminal designer's selection/preference or the user-configured settings.

After selection of the multiple content objects by the closed loop drawing event, the user can input a command with one of the drag events while the command tips are displayed. For instance, if a drag event occurs after selection of the multiple content objects, the control unit 160 may analyze the direction and speed of the drag event, and may execute the command determined based on the drag direction and speed.

The commands designated for the four boundaries of the touch screen 140 can be changed depending on whether the selected content objects are one or more content objects, and, accordingly, different command tips may be displayed. For example, the control unit 160 may instruct the display unit 130 to display first command tips on the boundaries of the touch screen 140 when a single content object is selected, and second command tips when multiple content objects are selected.

When another closed loop drawing event or a touch-down event is detected immediately after the multiple representative images are selected and highlighted in response to a closed loop drawing event detected on the touch screen 140, the control unit 160 can combine at least one representative image selected by the closed loop drawing event or the touch-down event with the previously selected representative images. Accordingly, the control unit 160 may inform the user of the content objects selected by means of the representative images, and a user may add or delete the content objects to and from a group of selected content objects.

As described above, according to exemplary embodiments of the present invention, a mobile terminal 100 may enable a mobile terminal user to input various commands with diversified touch events on the touch screen 140, thereby improving utilization of the mobile terminal and user convenience.

A touch input method for a mobile terminal is described hereinafter in detail.

Figure 5:
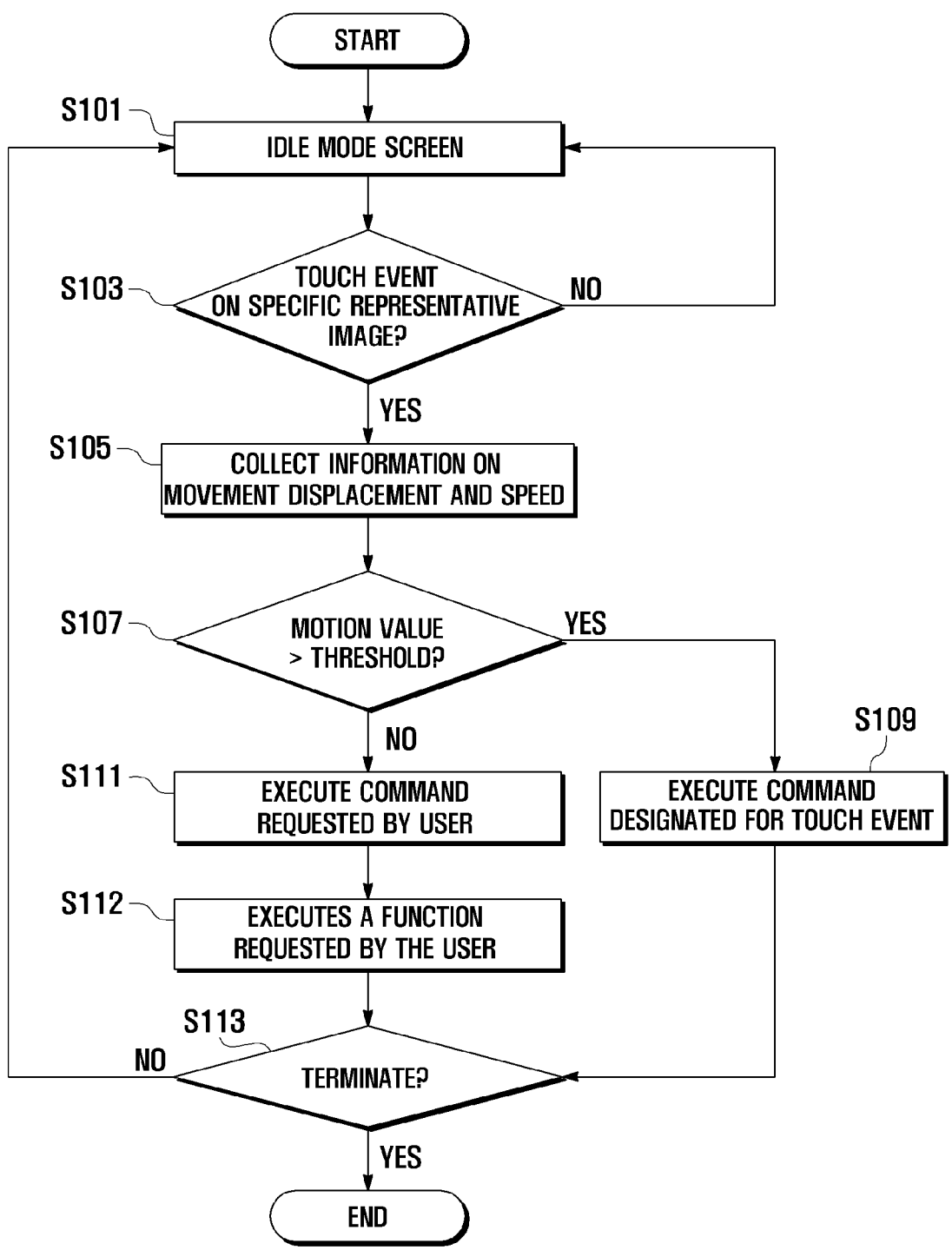
FIG. 5 is a flowchart illustrating a touch input method in a mobile terminal according to exemplary embodiments of the present invention.

FIG. 5 is a flowchart illustrating a touch input method for a mobile terminal according to exemplary embodiments of the present invention.

Referring to FIG. 5, when a mobile terminal 100 is supplied power, the mobile terminal 100 may initially display an idle mode screen (S101). The idle mode screen can be replaced, as configured by the user, with a specific application screen (e.g. the media board application screen on which a plurality of representative images represent the content objects stored in the storage unit 150). The media board application screen can also be used as the idle mode screen of the mobile terminal 100.

While the mobile terminal 100 operates in an idle mode, the touch event detector 161 of the control unit 160 may monitor the touch screen 140, and determine if a touch has occurred at a location where a representative image is situated (S103). If no touch is detected or the touch is detected at a location where no representative image is placed, the control unit 160 may maintain monitoring the idle mode screen or the media board application screen.

If a touch is detected at a location where a representative image is situated, the control unit 160 may determine that the touch corresponds to a touch-down event for selecting a representative image, and may collect information on the movement of the touch (S105). The movement information can include the contact point of the touch-down event and a motion value calculated using displacement and speed of the movement. For example, when a touch-down event is detected at a location where a representative image is situated, and then the touch moves in a particular direction at a particular speed, the control unit 160 may determine that a drag event has occurred following the touch-down event, and may subsequently calculate a motion value indicating the displacement and speed of the movement of the touch.

The control unit 160 may determine whether the calculated motion value of the movement is greater than a predetermined threshold value (S107). If the motion value is greater than the threshold value, the control unit 160 may determine the occurrence of a direction-specific drag event, and may execute a command designated for the direction-specific drag event (S109). That is, when a representative image is selected by a touch-down event and then a drag event occurs in a predetermined direction at a speed faster than a predetermined threshold value, the mobile terminal may execute a command designated for a direction-specific drag event. For instance, if the representative image representing a picture stored in the storage unit 150 is selected by the touch-down event and a drag event occurs in an upward direction at a speed faster than the predetermined threshold value, the control unit 160 may determine that an upward-drag event (e.g., "File name change") has occurred, and may display a popup window allowing the user to enter a new file name. Various commands can be designate for a direction-specific drag event according to the type of content and the direction, speed, and end point of the drag. The commands designated for a direction-specific drag event can include, but are not limited to, a "delete" command, "file transmission" command, and "text message composition" command.

After a representative image is selected by the touch-down event and moved by a direction-specific drag event, the control unit 160 may display, on the boundaries of the touch screen 140, command tips indicating the available commands designated for the direction-specific drag events. The commands may include, but are not limited to, for example, the file name change command, delete command, multimedia message application request command, and file transmission command. For example, command tips informing the user of the commands designated for the upward drag event, downward drag event, leftward drag event, and rightward drag event may be displayed inside the four corresponding boundaries of the touch screen 140.

If the motion value is not greater than the predetermined threshold value at step S107, the control unit 160 may execute a command requested by the user. For example, if the motion value is not greater than the predetermined threshold value, the control unit 160 may determine occurrence of a normal drag event, and may simulate the drag of the selected representative image or activate the selected representative image (S111). When a representative image is selected by the touch-down event and then a drag event occurs without lift of the contact on the touch screen 140, the control unit 160 may determine the movement speed and motion value at the end point of the drag event, and may compare the calculated motion value with a predetermined threshold value. If the motion value is less than the threshold value, the control unit 160 may determine that the drag event is a normal drag event for moving or selecting the representative image. The control unit 160 may then simulate the drag of the selected representative image and place the selected representative image at the location where the drag motion ends. The event map may map the touch events to commands associated with the representative images displayed on the touch screen 140.

After executing the command designated for the normal drag event, the control unit 160 executes a function requested by the user (S112). The user-requested function can be a zoom-in function for a picture and/or a playback function for an audio file.

Next, the control unit 160 may repeat steps S101 to S113 until a termination function command is detected (S113).

Figure 6:
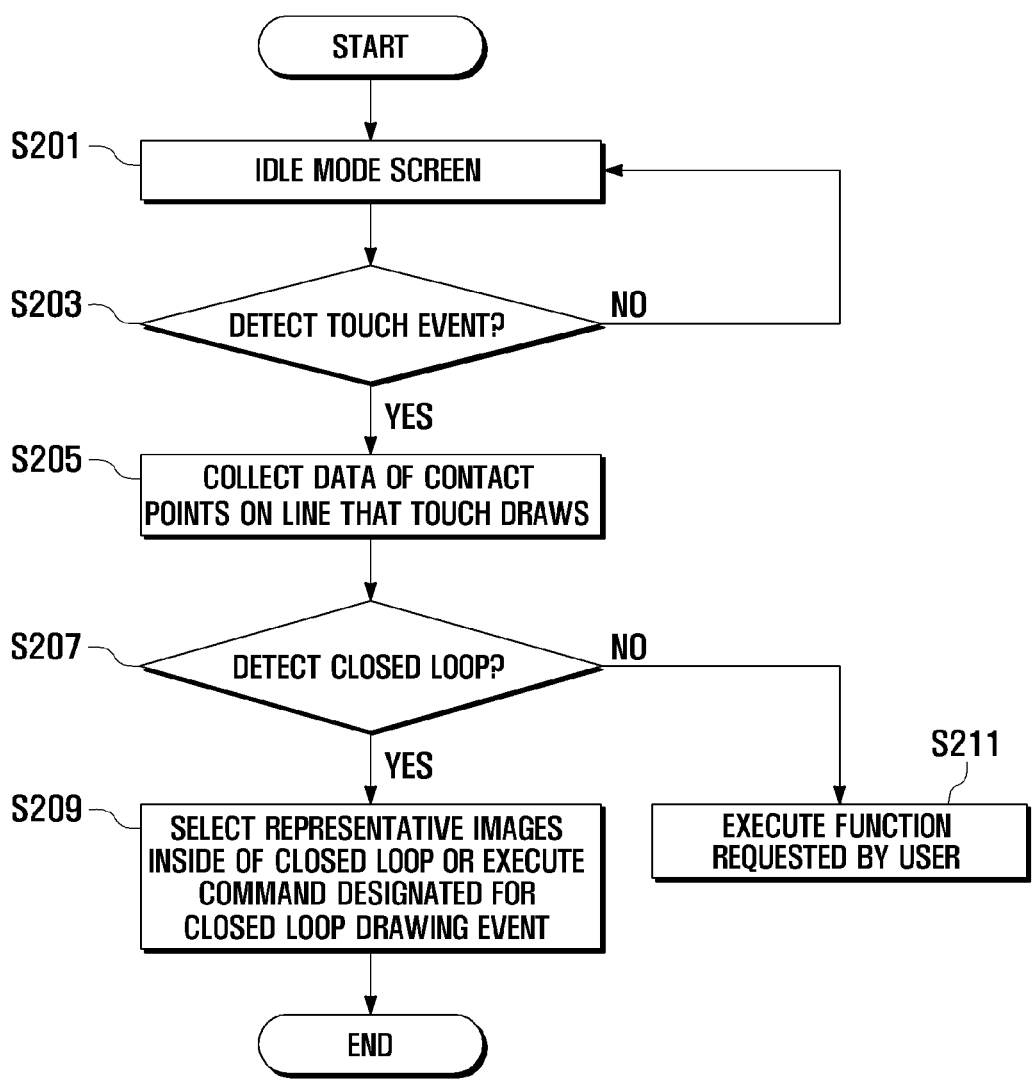
FIG. 6 is a flowchart illustrating a touch input method in a mobile terminal according to exemplary embodiments of the present invention.

FIG. 6 is a flowchart illustrating a touch input method for a mobile terminal according to exemplary embodiments of the present invention.

Referring to FIG. 6, when a mobile terminal 100 is supplied power, the control unit 160 may boot up the mobile terminal 100 with the operation system stored in the storage unit 150, and may display a preset idle mode screen (S201). The idle mode screen can be replaced, according to a configuration set by the user, with a specific application screen, for example, the media board application screen on which a plurality of representative images representing the content objects are displayed. The media board application screen can also be used as the idle mode screen of the mobile terminal 100. While the mobile terminal 100 operates in idle mode, the touch screen functionality may be activated, and the control unit 160 may configure an event map according to the idle mode screen or the media board application screen. The event map may map the representative images and other menu objects to the touch points such that, when a touch is detected on a representative image or a menu object, an input signal (command) mapped to the corresponding touch point may be executed.

While the mobile terminal operates in idle mode, the control unit 160 may monitor detection of a touch on the touch screen 140 (S203). If no touch is detected, the control unit 160 may continue displaying the idle mode screen or the multimedia board application screen.

If a touch is detected, the control unit 160 may collect the data of the contact points on a path (e.g., line) that the touch draws on the touch screen 140 without a touch-lift event occurring (S205). That is, when a touch is detected at a point on the touch screen and the touch moves on the touch screen 140 without a touch-lift event occurring (e.g., the contact is not lifted), the control unit 160 may collect the contact points, including the initial contact point, that the touch contacts.

Next, the control unit 160 may determine whether a closed loop drawing event (i.e., movement of the touch draws a closed loop) is detected (S207). To detect a closed loop, the control unit 160 may determine whether a specific contact point is detected twice while tracking the movement of the touch. For instance, when the touch starts moving from the initial touch point and returns to the initial touch point and is subsequently lifted (i.e., the start and end points of the movement of the touch are identical), the control unit 160 may determine occurrence of a closed loop drawing event. The closed loop can be formed when the start and end points of touch movement are identical and when the touch crosses a movement path/line of the touch on the touch screen 140.

If a closed loop drawing event is detected at step S207, the control unit 160 may selects the representative images located inside the closed loop or may execute a command designated for the closed loop drawing event (S209). For instance, when multiple representative images are selected by the closed loop drawing event on the touch screen 140, the control unit 160 can execute a content integration command for combining the multiple content objects represented by the selected representative images in a predetermined manner, as explained above. Various commands can be designated for the closed loop drawing event (e.g., the slide picture album generation command, selected object deletion command, selected object-inclusive multimedia message transmission command, and selected object Bluetooth transmission command). The command designated for the closed loop drawing event can be changed according to the user configuration or the mobile terminal designer's preference/selection. Once the command designated for the closed loop drawing event is executed, the control unit 160 may activate an application corresponding to the command, and may display an application screen of the activated application.

When multiple representative images are selected by the closed loop drawing event, the control unit 160 can instruct the display unit 130 to display the command tips on the boundaries of the touch screen 140 thereby informing the user of commands designated for available drag events following the closed loop drag event. The commands designated for available drag events can be executed by touching the corresponding command tips.

The range of the selection based on the closed loop drawing event can be determined by the mobile terminal designer's preference/selection, or according to the user configuration. For example, as described above, in some cases, the control unit 160 can select only representative images inside of the closed loop, and, in some cases, the control unit 160 can select the representative images situated on the boundary line of the closed loop, as well as those placed inside of the closed loop. In some cases, the control unit 160 can select only a representative image situated on the boundary line of the closed loop that has a portion of the representative image situated inside the closed loop that is greater than a predetermined percentage, in addition to the representative images situated wholly inside of the closed loop.

When another closed loop drawing event or a touch-down event is detected immediately after the multiple representative images are selected and highlighted in response to a closed loop drawing event detected on the touch screen 140, the control unit 160 can combine the at least one representative image selected by the second closed loop drawing event or the touch-down event with the previously selected representative images. Accordingly, the control unit 160 may inform the user of the content objects selected by means of the representative images. The user can subsequently add or delete the content objects to and from a group of selected content objects.

The commands designated for the four boundaries of the touch screen 140 can be changed depending on whether the selected content objects are one or more and, as a consequence, different command tips may be displayed. For example, the control unit 160 may instruct the display unit 130 to display first command tips on the boundaries of the touch screen 140 when a single content object is selected, and second command tips when multiple content objects are selected.

If a closed loop drawing event is not detected at step S207, the control unit 160 may execute a function requested by user (S211).

As described above, a touch input device and method for a mobile terminal according to exemplary embodiments of the present invention may enable selecting multiple content objects with a single touch event and designating different commands for the same touch event depending on the number of selected contents. Accordingly, various commands may be inputted using limited number of touch events and a user may be provided with greater user convenience.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A touch input method for a mobile terminal having a touch screen, the method comprising:
    displaying, on the touch screen, a plurality of representative images corresponding to content objects;
    selecting, from the plurality of representative images, one or more representative images in response to a first touch event detected on the touch screen;
    detecting a second touch event on the touch screen, the second touch event moving the selected one or more representative images towards a boundary of the touch screen;
    displaying, in response to detecting the second touch event, one or more command tips on the touch screen;
    identifying a command tip from the displayed one or more command tips based on a direction of movement of the second touch event towards the boundary of the touch screen; and
    executing a command corresponding to the identified command tip in response to a movement speed value of the second touch event being greater than a threshold value,
    wherein the display of the one or more command tips varies based on a number of the selected one or more representative images and one or more user-defined preferences.

2. The touch input method of claim 1, wherein the one or more command tips correspond to second commands associated with available direction-specific touch events.

3. The touch input method of claim 2, wherein:
    the second touch event is one of the available direction-specific touch events comprising movement towards the boundary of the touch screen; and
    the second command corresponds to the identified command tip, the identified command tip being displayed on the boundary.

4. The touch input method of claim 2, wherein the one or more command tips further vary based on a type of content associated with the selected one or more representative images.

5. The touch input method of claim 1, wherein:
    selecting the one or more representatives image comprises:
        collecting data associated with contact points in response to a line being drawn, without lift, via the first touch event on the touch screen;
        determining, based on the data associated with the contact points, whether a closed loop is drawn; and
        selecting, in response to a determination of the drawn closed loop being drawn, at least one of a first set of the representative images located inside the closed loop, a second set of the representative images situated on the line, and a third set of the representative images; and
    each representative image of the third set comprises a portion inside of the closed loop, the portion corresponding to a first percentage being greater than a determined percentage.

6. The touch input method of claim 5, wherein selecting the one or more representative images further comprises:
    detecting another touch event corresponding to drawing a second closed loop, the another touch event adding representative images selected using the second closed loop; and
    detecting a touch-down event for adding a representative image.

7. The touch input method of claim 5, wherein executing the second command comprises:
    executing, if the one or more representative images comprises multiple representative images, the command corresponding to the second touch event, the second touch event resulting in selection of multiple content objects.

8. The touch input method of claim 7, wherein executing the command comprises creating a new content object by combining the content objects represented by the multiple representative images.

9. A touch input method for a mobile terminal having a touch screen, the method comprising:
    detecting a closed loop touch event on the touch screen;
    selecting, in response to detecting the closed loop touch event, a set of representative images displayed via the touch screen, each of the representative images being associated with content; and
    displaying a new representative image corresponding to an executable presentation combining the content associated with each of the representative images of the set.

10. The touch input method of claim 9, further comprising:
    displaying, in response to selecting the set of representative images, command tips at different boundaries of the touch screen, a first command tip of the command tips corresponding to generating the executable presentation,
    wherein the display of the command tips varies according to types of the content associated with the set of representative images.

11. The touch input method of claim 10, further comprising:
    detecting a touch dragging the selected set of representative images in a direction corresponding to the first command tip,
    wherein the new representative image is displayed in response to detecting the touch.

12. The touch input method of claim 11, further comprising:
    determining that a speed of the dragging is greater than a threshold value,
    wherein the new representative image is further displayed in response to the speed being greater than the threshold value.

13. The touch input method of claim 9, wherein:
    a first representative image of the representative images is associated with auditory content;
    second representative images of the representative images is associated with visual content; and
    the executable presentation combines the visual content associated with the second representative images into a slide show comprising the auditory content as background audio.

14. The touch input method of claim 13, wherein:
    some of the second representative images are associated with still image content;
    some of the second representative images are associated with motion image content; and
    the executable presentation is generated sequentially ordering the still image content after the motion image content.

15. The touch input method of claim 9, wherein the new representative image replaces the display of the set of representative images.

16. A touch input device for a mobile terminal, the touch input device comprising:
    a display unit to:
        display representative images, each representative image corresponding to a content object, and
        detect touch events; and
    a control unit to:
        select one or more of the representative images in response to detection of a first touch event,
        display, in response to detection of a second touch event, one or more command tips on the display unit, the second touch event moving the selected one or more representative images towards a boundary of the display unit,
        identify a command tip from the displayed one or more command tips based on a direction of movement of the second touch event towards the boundary of the display unit, and
        execute a user command corresponding to the identified command tip in response to a movement speed value of the second touch event being greater than a threshold value,
    wherein the display of the one or more command tips varies based on a number of the selected one or more representative images.

17. The touch input device of claim 16, wherein:
    the boundary is one of a plurality of different boundaries;
    two of the different boundaries oppose one another in a first direction; and
    two of the different boundaries oppose one another in a second direction crossing the first direction.

18. The touch input device of claim 17, wherein the control unit is configured to display a drag of the selected one or more representative images in response to the movement speed value being less than the threshold value.

19. The touch input device of claim 16, wherein:
    selection of the one or more representative images comprises:
        collection of data associated with contact points of a line being drawn, without lift, via the first touch event on the touch screen,
        determination of whether a closed loop is drawn based on the data, and
        selection, in response to a determination that the closed loop has been drawn, at least one of a first set of the representative images located inside the closed loop, a second set of the representative images situated on the line, and a third set of the representative images; and
    each representative image of the third set comprises a portion inside of the closed loop, the portion corresponding to a first percentage being greater than a determined percentage.

20. The touch input device of claim 19, wherein, in response to execution of the user command, the control unit is configured to display a new representative image corresponding to an executable presentation combining the content objects associated with each of the selected one or more representative images.

* * * * *